United States Patent Office 3,629,334
Patented Dec. 21, 1971

3,629,334
SUBSTITUTED GUANYL-FORMAMIDINES
Pál Benko and László Pallos, Budapest, Lajos Váczi, Debrecen, and Endre Komlós and Ferenc Ördögh, Budapest, Hungary, assignors to Egysesult Gyogyszer-Es Tapszergyar, Budapest, Hungary
No Drawing. Filed Apr. 2, 1968, Ser. No. 718,205
Claims priority, application Hungary, Apr. 8, 1967, EE/1377
Int. Cl. C07c 129/00
U.S. Cl. 260—565
6 Claims

ABSTRACT OF THE DISCLOSURE

Substituted guanyl-formamidines of the formula

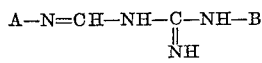

wherein A is a nitrile or carboethoxy group, an aryl or aralkyl group or a substituted aryl or aralkyl group or a pyridyl group or a substituted pyridyl group, and B is hydrogen or an aryl group or a substituted aryl group are disclosed to be useful as hypertensive agents, virostatic agents as well as being effective against bacteria and fungi.

---

The invention relates to new substituted guanyl-formamidines.

The new N-substituted N′-guanyl formamidines of the present invention are characterized by the Formula I

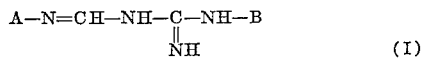  (I)

wherein A is a nitrile or carboethoxy group, an aryl or aralkyl group, an aryl or aralkyl group substituted by one or two of the same or different halogen, lower alkyl, lower alkoxy, trihaloalkyl or nitro substituents, a naphthyl or tetrahydronaphthyl group, a pyridyl group or a pyridyl group substituted by halogen, lower alkyl or nitro substituents, and B is hydrogen, an aryl group or an aryl group substituted by a halogen, lower alkyl, trihaloalkyl, hydroxy or nitro substituent.

By the terms "lower alkyl" or "lower alkoxy," as used herein is meant that the groups in question contain 1 to 6 carbon atoms.

The new N-substituted N′-guanyl-formamidines of the Formula I can be prepared in different ways. According to one method, these compounds are prepared by reacting a formimino ether of the Formula II

A—N=CH—OR  (II)

wherein A is as defined above and R is a lower alkyl group, with a guanidine of the Formula III

  (III)

wherein B is as defined above, or with a salt thereof. This reaction can be performed preferably in the presence of a solvent, at a temperature between —5° C. and 150° C. The guanidine is used preferably in a slight excess.

The formimino ethers of the Formula II used as starting materials are known compounds which can be prepared e.g. by reacting the corresponding amines of the formula A—NH₂ with orthoformates of the Formula HC(OR)₃.

According to another method, the guanyl formamidines of the Formula I can be prepared by reacting a formamidine of the Formula IV

A—N=CH—NH₂  (IV)

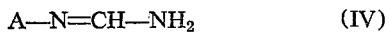

wherein A as as defined above, with an O-alkyl-iso-urea or with an S-alkyl-iso-thiourea of the Formula V

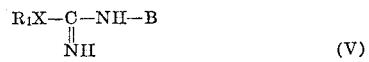  (V)

wherein B is as defined above, R is lower alkyl, preferably methyl or ethyl, and X is oxygen or sulphur. This reaction can be performed preferably in a presence of a solvent, at a temperature between —5° C. and 150° C.; in some cases it is preferable to work at lower temperatures.

Asymmetrically substituted formamidines of the Formula IV, which can be used as starting materials in this reaction, and a process for the preparation thereof are described in the literature, e.g. in U.S. Pat. 3,073,851 and 3,153,033; according to previous patent applications of the present applicants, these asymmetrically substituted formamidines can also be prepared by the reaction of ammonia with a formimino ether of the Formula II.

According to another method, the guanyl formamidines of the Formula I can also be prepared by the addition reaction of an N-substituted cyanamide of the Formula VI

B—NH—CN  (VI)

wherein B is as defined above, with an asymmetrically substituted formamidine of the Formula IV

A—N=CH—NH₂

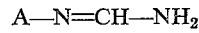

wherein A is as defined above. This reaction is performed preferably by heating the mixture of the reactants in a solvent, usually at the reflux temperature of the reaction mixture. The starting formamidine is used preferably in the form of an acid addition salt, e.g. of the hydrochloride; the reaction product of the Formula I is obtained in such cases also in the form of the corresponding acid addition salt which can be purified in a simple way by recrystallization or re-precipitation.

The starting iso-cyanates and iso-thiocyanates of the Formula VI are known compounds; their preparation is described in the literature, e.g. in U.S. Pats. 3,073,851

According to a further method, the guanyl formamidines of the Formula I can also be prepared by the reaction of an N-substituted azomethinyl-O-alkyl-iso-urea or —S-alkyl-iso-thiourea of the Formula VII

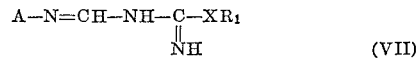  (VII)

wherein A, R₁ and X are as defined above, with a primary amine of the Formula VIII

B—NH₂  (VIII)

wherein B has the same meaning as above. This reaction is performed preferably in the presence of a solvent, e.g. of ethanol, at elevated temperature, up to the reflux temperature of the reaction mixture.

The starting N-substituted azomethinyl-O-alkyl-iso-ureas or —S-alkyl-iso-thioureas of the Formula VII can be obtained in very good yields by the reaction of forminino-alkyl-ethers of the Formula II with O-alkyl-iso-ureas or S-alkyl-iso-thioureas.

The guanyl-formamidines of the Formula I can be prepared, according to a further method, by reacting a nitroso-guanyl-formamidine of the Formula IX

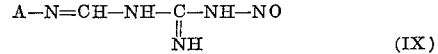
  (IX)

wherein A is as defined above, with an amine of the Formula VIII

B—NH₂  (VIII)

wherein B is as defined above. This reaction can be performed readily in the presence of a solvent, e.g. aqueous ethanol, at ambient temperature or with moderate heating. The reaction is accompanied by the evolution of nitrogen, and is completed when the gas-evolution ceases.

The starting nitroso-guanyl-formamidines of the Formula IX can be prepared by reacting formiminoalkyl-ethers of the Formula II with nitroso-guanidine.

A further possibility for the synthesis of the guanyl-formamidines of the Formula I is by reacting an N'-substituted N-nitroso-guanidine of the Formula XI

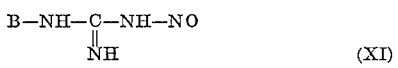

(XI)

wherein B is as defined above, with an amine of the Formula X

A—NH$_2$    (X)

wherein A is as defined above. This reaction can be performed under similar conditions as the above mentioned reaction of the nitroso compounds of the Formula IX with amines of the Formula VIII. The preparation of the starting N'-substituted N-nitroso-guanidines is described in the literature [J. Am. Chem. Soc., 59, 2113 (1937)].

Finally, the guanyl-formamidines of the Formula I can also be prepared by reacting an N'-substituted N-formyl-guanidine of the Formula XII

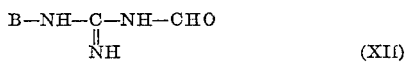

(XII)

wherein B is as defined above, with an amine of the Formula X

A—NH$_2$    (X)

wherein A is as defined above. This reaction can be performed according to the usual methods of the formation of Schiff-bases, by heating equimolecular amounts of the reactants in a non polar solvent, e.g. benzene or toluene, while the water formed in the course of the reaction is distilled off azeotropically from the reaction mixture. The reaction is completed when the theoretical amount of water is collected in the receiver.

The starting N'-substituted N-formyl-guanidines of the Formula XII can be prepared as described in Berichte, 43, 3587 (1910).

The new guanyl-formamidines of the Formula I are obtained by the methods described above, depending on the nature of the starting materials and on the reaction conditions, in the form of free bases or of acid addition salts. The free bases may be liberated from the latter by known methods, and the free bases can be converted by known methods into pharmaceutically acceptable acid addition salts.

The new guanyl-formamidines of the present invention have valuable pharmacological properties; they have a virostatic activity and are also effective against different bacteria and fungi in low concentrations. Especially favorable results have been obtained against the PRB influenza-virus and the "Parainfluenza I" virus, as well as against Gram-positive cocci and against different non-sporulating and anaerobically sporulating bacteria. Other compounds of the Formula I increase the blood pressure and can be used as hypertensive agents.

The new guanyl-formamidines of the Formula I can be administered orally or parenterally in the form of the usual pharmaceutical compositions containing at least one free base of the Formula I or a salt of a pharmaceutically acceptable acid in combination with the usual solid or liquid pharmaceutical carriers and/or other known additives.

The preparation of the new guanyl-formamidines is illustrated in greater detail by the following examples without being limited to them:

EXAMPLE 1

From 9.55 g. (0.1 mol.) of guanidine hydrochloride, guanidine base is liberated with sodium ethoxide in 50 ml. of ethanol and toluene was added to the solution and the ethanol was distilled off azeotropically with part of the toluene so as to replace the solvent entirely by toluene. 18.36 g. (0.1 mol) of N-(p-chlorophenyl)-form-imino-ethyl ether were then added to the solution and the mixture was kept at 35° C. for several hours. The formed precipitate was separated by filtration; N-(p-chlorophenyl) - N' - guanyl-formamidine was obtained, M.P. 265–267° C. (decomp.).

The free base obtained above was converted into the monohydrochloride by treating it with an ether solution of hydrochloric acid. The precipitated monohydrochloride melted at 260° C.

EXAMPLE 2

18.46 g. (0.1 mol) of N-(5-chloro - 2 - pyridyl)-form-iminoethyl ether were dissolved in 50 ml. of ethanol and the solution was added dropwise to a solution of 18.56 g. (0.1 mol) of o-tolyl-guanidine hydrochloride in 60 ml. of ethanol. The reaction mixture was heated for 2–3 hours at 40–45° C., and was then cooled to 10° C. The N - (5-chloro-2-pyridyl)-N'-(o-tolyl)-guanyl-formamidine crystallized and was separated by filtration; M.P. 116–117° C.

EXAMPLE 3

A mixture of 18.52 g. (0.1 mol) of N-(α-naphthyl)-formimino-methyl ether and 6.49 g. (0.11 mol.) of guanidine in 70 ml. of ethanol was treated for 3–4 hours at 50° C. and then cooled to 5° C. The N-(α-naphthyl)-N'-guanyl-formamidine crystallized and was separated by filtration; M.P. 179–180° C.

EXAMPLE 4

136.15 g. (1 mol) of N-(4-pyridyl)-formiminomethyl ether was reacted with 59.07 g. (1 mol of guanidine, as described in Example 1. The obtained N-(4-pyridyl)-N'-guanyl-formamidine melted at 174–175° C.

EXAMPLE 5

145.16 g. (1 mol.) of N-carboethoxy-formimino-ethyl ether were reacted with 185.6 g. (1 mol.) of o-tolyl guanidine, as described in Example 2. The obtained N-carbo-ethoxy-(o-tolyl-guanyl)-azomethine hydrochloride melted at 98–100° C.

EXAMPLE 6

179.22 g. (1 mol.) of N-(p-anisyl)-formimino ethyl ether were reacted with 62.02 g. (1.05 mol.) of guanidine as described in Example 3. The obtained N-(p-anisyl)-N'-guanyl-formamidine melted at 236° C.

EXAMPLE 7

16.32 g. (0.1 mol.) of N-(p-tolyl)-formimino ethyl ether were reacted with 5.9 g. (0.1 mol.) of guanidine as described in Example 3. The obtained N-(p-tolyl)-N'-guanyl-formamidine melted at 40–43° C.

EXAMPLE 8

21.8 g. (0.1 mol.) of N-(2,6-dichlorophenyl)-forminino ethyl ether were reacted with 5.9 g. (0.1 mol.) of guanidine as described in Example 3. The obtained N-(2,6-dichlorophenyl)-N'-guanyl-formamidine was converted into the hydrochloride salt in the usual manner. The hydrochloride melted at 232° C. (decomp.)

EXAMPLE 9

40.64 g. (0.2 mol.) of N-(1,2,3,4-tetrahydro-α-naphthyl)-formimino ethyl ether were reacted with 11.8 g. (0.2 mol.) of guanidine as described in Example 3. The obtained N-(1,2,3,4-tetrahydro-α-naphthyl)-N'-guanyl-formamidine was converted into the hydrochloride salt in the usual manner. The hydrochloride melted at 210–212° C.

EXAMPLE 10

98.11 g. (1 mol.) of N-cyano-formimino ethyl ether were reacted with 185.22 g. (1 mol.) of β-naphthyl-guanidine as described in Example 3. The obtained N-cyano-N'-(β-naphthyl)-guanyl-formamidine melted at 126–127° C.

EXAMPLE 11

237.3 g. (1 mol.) of N-(3,4-dimethoxyphenyl-ethyl)-formimino ethyl ether were reacted with 151.17 g. (0.1 mol.) of p-hydroxyphenyl-guanidine as described in Example 3. The obtained N-(3,4-dimethoxyphenyl-ethyl-N'-(p-hydroxyphenyl-guanyl)-formamidine was converted into the hydrochloride salt in the usual manner. The hydrochloride melted at 188° C. (decomp.).

EXAMPLE 12

A mixture of 121.14 g. (1 mol.) of N-(2-pyridyl)-formamidine and 218.07 g. (1 mol.) of S-methyl-iso-thiourea hydrochloride in 1800 ml. of ethanol was cooled to 10–15° C. for 3–4 hours. The solvent was then distilled off; the obtained N-(2-pyridyl)-N'-guanyl-formamidine melted at 230–332° C.

The obtained base was converted into the hydrochloride salt, as described in Example 1. The N-(2-pyridyl)-N'-guanyl-formamidine dihydrochloride melted at 138–140° C.

EXAMPLE 13

A mixture of 15.46 g. (0.1 mol.) of N-(m-chlorophenyl)-formamidine and 7.40 g. (0.1 mol.) of S-methyl-iso-thiourea in 100 ml. of ethanol was refluxed for several hours. An equimolecular amount of hydrochloric acid in ethanol was then added to the reaction mixture which was cooled then to 5° C. The obtained N-(m-chlorophenyl)-N'-guanyl-formamidine dihydrochloride melts at 250–252° C.

EXAMPLE 14

A mixture of 22.55 g. (0.1 mol. N-(2,3-dichlorophenyl)-formamidine hydrochloride and 16.81 g. (0.4 mol.) of cyanamide in 350 ml. of ethanol was refluxed for 2–4 hours. The precipitated product is separated by filtration; the obtained N-(2,3-dichlorophenyl)-N'-guanyl-formamidine hydrochloride melted at 170–172° C.

The base was liberated from this salt by treating it with an ethanolic sodium hydroxide solution in the presence of sodium aceate. The N-(2,3-dichlorophenyl)-N'-guanyl-formamidine melted at 176–178° C.

EXAMPLE 15

206.68 g. (1 mol.) of N-(β-naphthyl)-formamidine hydrochloride were reacted with 132.17 g. (1 mol.) of N-benzyl-cyanamide as described in Example 14. N-(β-naphthyl)-N'-(benzyl-guanyl)-formamidine hydrochloride was obtained; M.P. 290° C. (decomp.).

EXAMPLE 16

20.83 g. (0.1 mol. ) of N-(3-methyl-2-pyridyl)-azomethinyl-S-methyl-iso-thourea were dissolved in ethanol and dry ammonia gas was bubbled through the stirred solution at 30–35° C. for 2–4 hours. The precipitated product was then separated by filtration; the obtained N-(3-methyl-2-pyridyl)-N'-guanyl-formamidine melted at 158–160° C.

EXAMPLE 17

A mixture of 25.66 g. (0.1 mol.) of N-(2-chloro-4-nitrophenyl)-azomethinyl-0-methyl-iso-thiourea and 16.11 g. (0.1 mol.) of m-amino-benzotrifluoride in 300 ml. of ethanol was refluxed for 2–3 hours. The precipitated product was then separated by filtration. The obtained N-(2-chloro-4-nitrophenyl) - N' - (m - trifluoromethyl - phenyl-guanyl)-formamidine melted at 224–225° C.

EXAMPLE 18

24.12 g. (0.1 mol.) of N-(α-naphthyl)-N'-nitrosoguanyl-formamidine were suspended in 70 percent aqueous ethanol, and 9.31 g. (0.1 mol.) of aniline were added at 20–25° C. to the suspension. After the gas-evolution ceased, the reaction mixture was evaporated to dryness. The N-(α-naphthyl)-N'-(N''-phenyl-amino-guanyl)-formamidine obtained as a residue was then recrystallized repeatedly from aqueous ethanol. The purified product melted at 202–205° C.

From this base the hydrochloride was prepared as described in Example 1, M.P. 237–238° C.

EXAMPLE 19

1.92 g. (0.01 mol.) of N-(2-pyridyl)-N'-nitrosoguanyl-formamidine was reacted with 1.07 g. (0.01 mol.) of o-toluidine as described in Example 18, and the product was converted into the hydrochloride. The obtained N-(2-pyridyl)-N,N''-o-tolyl-guanyl) - formamidine hydrochloride melted at 103–106° C.

EXAMPLE 20

120.16 g. (1 mol.) of N-phenyl-formamidine were reacted with 88.07 g. (1 mol.) of nitrosoguanidine, as described in Example 18, and the product was converted into the hydrochloride. The obtained N-phenyl-N'-guanyl-formamidine dihydrochloride melted at 313° C.

EXAMPLE 21

116.13 g. (1 mol.) of N-carboethoxy-formamidine are reacted with 213.23 g. (1 mol.) N-nitroso-N'-(β-naphthyl)-guanidine as described in Example 18, and the product was converted into the hydrochloride. The obtained N-carboethoxy-N'-(β-naphthyl - guanyl) - formamidine hydrochloride melted at 154–156° C.

EXAMPLE 22

A mixture of 8.7 g. (0.1 mol.) of N-formyl-guanidine and 8.9 g. (0.1 mol.) of urethane in 150 ml. of toluene was refluxed and the water formed in the course of the reaction was azeotropically distilled from the stirred reaction mixture. The reaction was completed when the theoretical amount of water had been collected in the receiver. The solvent was then distilled off from the reaction mixture and the residue was recrystallized repeatedly from toluene. The obtained pure N-guanyl-N'-carboethoxy formamidine melted at 312–313° C.

EXAMPLE 23

20.81 g. (0.1 mol.) of N-(m-nitrophenyl)-N'-formyl-guanidine were reacted with 12.76 g. (0.1 mol.) of m-chloroaniline, as described in Example 22. The obtained N-(m-chlorophenyl)-N'-(N''-m - nitrophenyl - guanyl)-formamidine was then converted into the hydrochloride; M.P. 282–283° C.

EXAMPLE 24

21.8 g. (0.1 mol.) of N-(2,6-dichlorophenyl)formimino ethyl ether were reacted with 14.3 g. (0.1 mol.) of benzyl guanidine as described in Example 1. The obtained N-(2,6-dichlorophenyl) - N' - benzylguanyl - formamidine melted at 149–150° C.

What we claim is:
1. A compound of the formula:

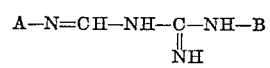

wherein A is phenyl, naphthyl, 1,2,3,4-tetrahydronaphthyl, metachloro phenyl, para-chlorophenyl, paraanisyl, para-tolyl, 2,6-dichlorophenyl, 3,4-dimethoxyphenyl, 2,3-dichlorophenyl or 2-chloro-4-nitrophenyl and B is a hydrogen atom, para-hydroxyphenyl radical, a benzyl radical, meta-trifluoromethyl phenyl radical, meta-nitro-phenyl radical or a phenyl-amino radical and salts thereof with pharmaceutically acceptable acids.

2. A compound as claimed in claim 1 which is N-(p-chlorophenyl)-N′-guanyl-formamidine.

3. A compound as claimed in claim 1 which is N-(α-naphthyl)-N′-guanyl-formamidine.

4. A compound as claimed in claim 1 which is N-(p-anisyl)-N′-guanyl-formamidine.

5. A compound as claimed in claim 1 which is N-(p-tolyl)-N′-guanyl-formamidine.

6. A compound as claimed in claim 1 which is N-(2,6-dichlorophenyl)-N′-guanyl-formamidine.

References Cited

Shriner et al., Chem. Rev. vol. 35, pp. 372–73 (1944).
Cyanamid's Nitrogen Chemicals Digest, vol. IV, p. 15 (1950).

DANIEL D. HORWITZ, Primary Examiner

G. A. SCHWARTZ, Assistant Examiner

U.S. Cl. X.R.

260—564 A, 564 F, 296 R, 464, 465 E, 471 A, 482 R, 564 E, 999